March 28, 1967
R. M. PAGE
3,311,912
RADAR RECOGNITION SYSTEM
Filed Dec. 11, 1942
3 Sheets-Sheet 1
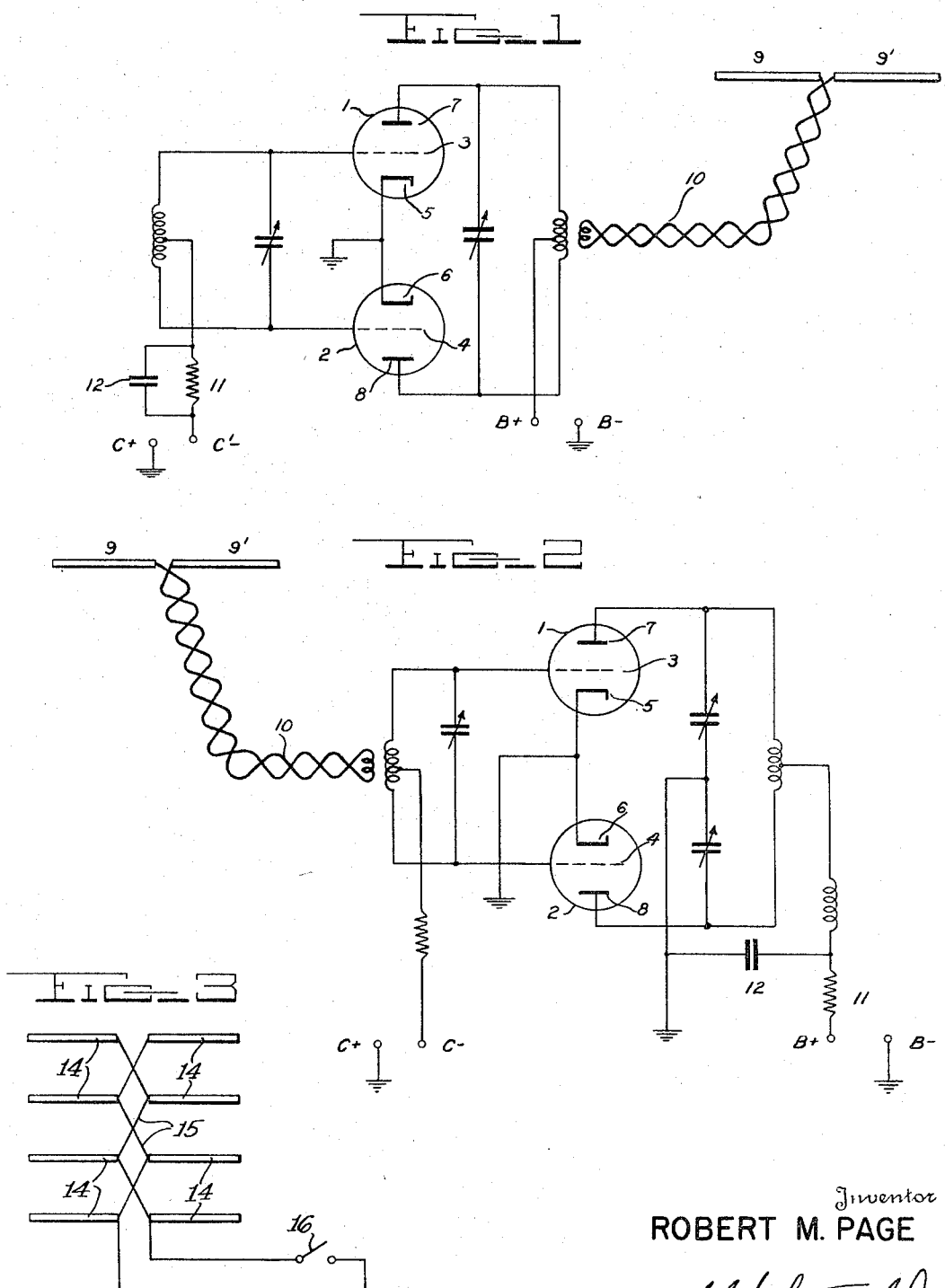
Inventor
ROBERT M. PAGE
By
Attorney

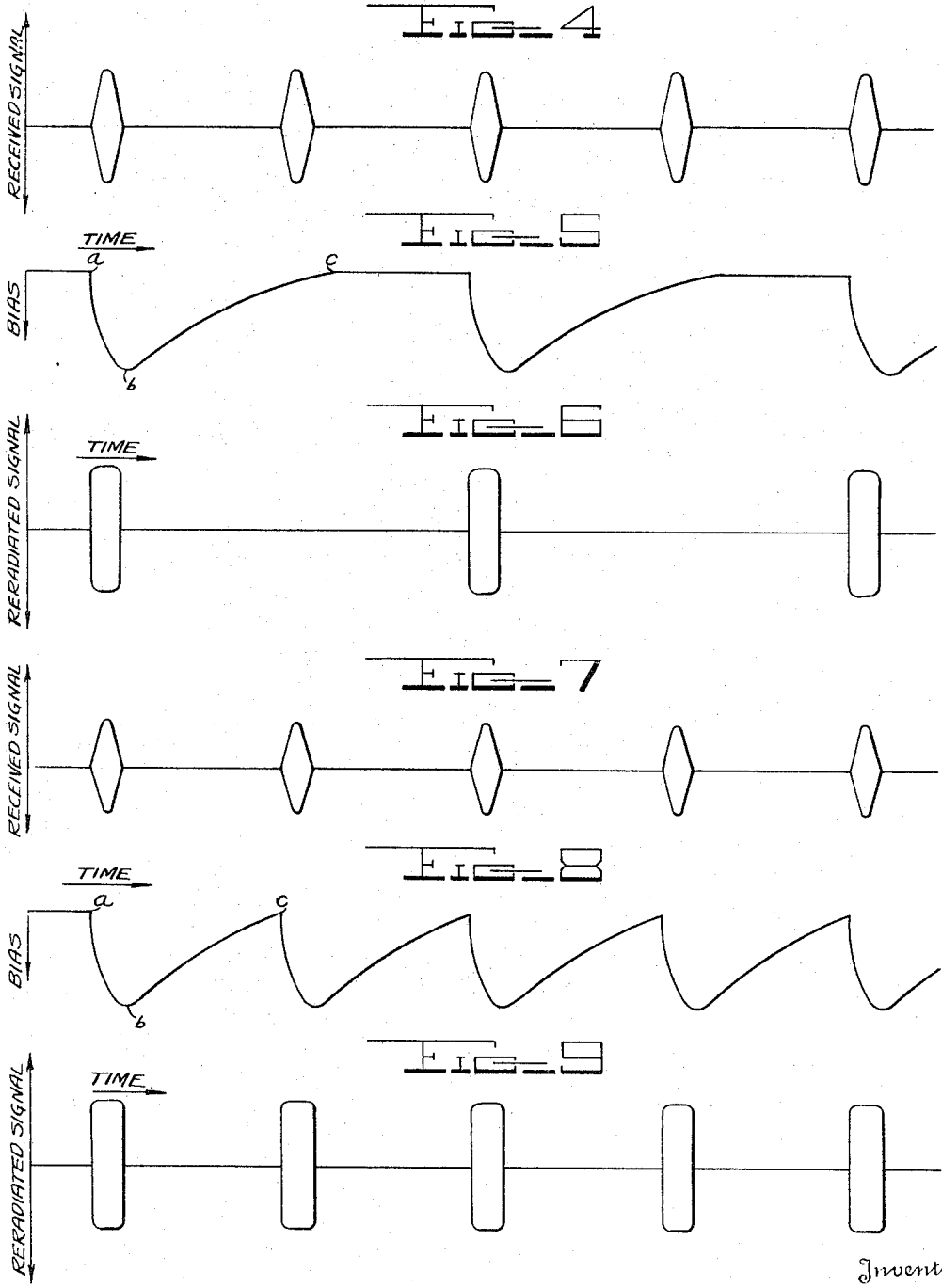

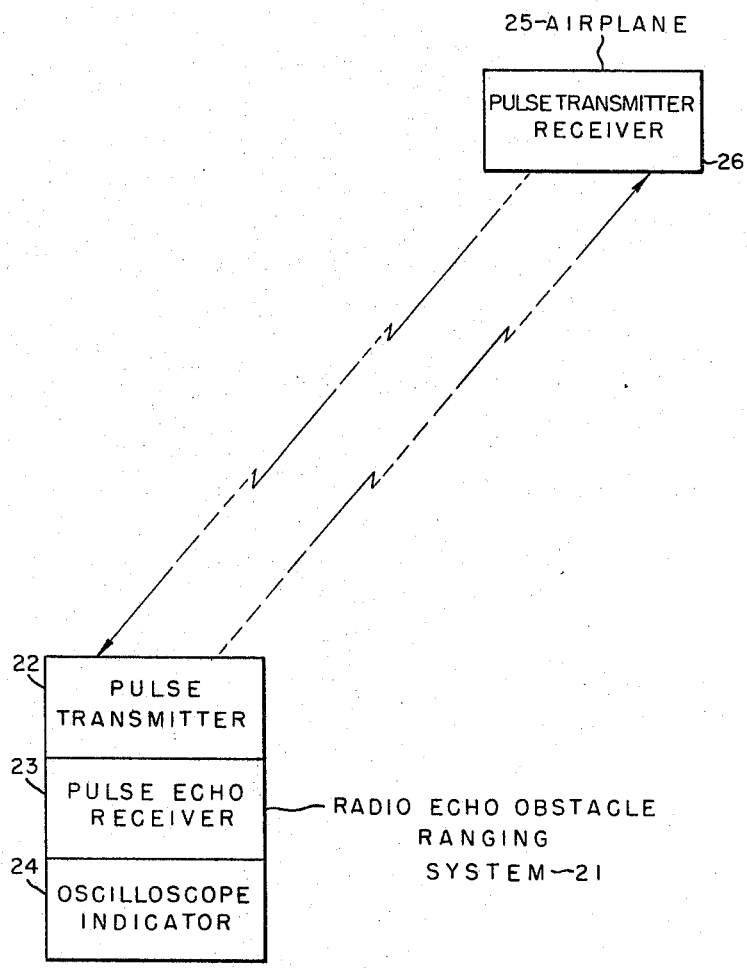

United States Patent Office 3,311,912
Patented Mar. 28, 1967

3,311,912
RADAR RECOGNITION SYSTEM
Robert M. Page, Washington, D.C., assignor, by direct and mesne assignments, of one-eighth to La Verne R. Philpott, three-eighths to Leo C. Young, one-eighth to John R. Page and two-eighths to Grace Gowens Leaf, trustee
Filed Dec. 11, 1942, Ser. No. 468,648
7 Claims. (Cl. 343—6)

The invention described herein may be manufactured and used by or for the Government of the United States of America for governmental purposes without the payment of any royalties thereon or therefor.

This invention relates to a device for use on board ships and aircraft in order to properly and automatically identify them upon a traversal of the radio beam of a friendly pulse transmitter.

One of the main advantages inherent in the present day system of radio obstacle detection is the ability of the system to provide an early warning of the presence of remote objects. A disadvantage of the system, however, resides in the fact that some of these early warnings are fallacious in that they may come from remote craft belonging to friendly forces. Let us assume a typical case where an airplane supplied with radio echo apparatus is assigned certain patrolling duties covering a large expanse of water and coast line. The operator observes an echo on the oscilloscope which indicates the presence of an obstacle, say about ten miles to the port side of the airplane. The pilot then orients his plane in the direction of the obstacle and proceeds in that direction until he comes within visual range of the obstacle producing the echo which he finds is a friendly ship. Obviously this time and fuel consuming excursion could have been avoided if some automatic means were employed by the ship for identifying itself upon first encountering the pulse transmitter beam.

It is therefore an object of this invention to provide an automatic means for use on ships and aircraft for properly identifying themselves upon traversing the radiated beam of a pulse transmitter.

It is another object of this invention to provide a pulse transmitter which operates only when subjected to the field of another transmitter.

Other objects of the present inventoin will become apparent upon a careful consideration of the following description when taken together with the accompanying drawings, in which:

FIG. 1 is a schematic diagram of a preferred embodiment of the present invention;

FIG. 2 is a schematic circuit diagram of a modification of the present invention;

FIG. 3 shows a series of one-half wave dipoles comprising another embodiment of the present invention;

FIGS. 4 and 7 show graphically a series of typical pulses which emanate from a remote pulse transmitter and are used for keying the present device;

FIGS. 5 and 8 illustrate graphically the typical charge and discharge characteristics of a condenser used in the quench circuit of the present device;

FIGS. 6 and 9 show graphically a series of typical output pulses produced by the present device and FIG. 10 illustrates the relationship between the radio echo obstacle ranging system and the pulse transceiver aboard an airplane.

Referring now to the circuits contained in FIGS. 1 and 2, reference characters 1 and 2 pertain to a pair of vacuum tubes each having an anode 7 and 8, a cathode 5 and 6 and a grid 3 and 4 respectively. These vacuum tubes are so connected as to form what is known as a tuned grid-tuned plate oscillator which is adjusted to operate at some standard frequency adopted by most radio obstacle detection gear. Half-wave dipoles 9, 9', coupled, for example, by a transposed transmission line 10 to either the plate tank circuit as shown in FIG. 1 or to the grid tank circuit as shown in FIG. 2, provide the oscillator with a means for receiving energy from, as well as transmitting energy to some remote radio obstacle detection station. Resistance 11 and capicitance 12 comprise what is known as the oscillation quench circuit which controls both the time duration and repetition rate of the pulses emanating from the present oscillator. The operation of the quench circuits shown in FIGS. 1 and 2 is more fully set forth and claimed in my application, Serial No. 223,503, entitled "Oscillation Generator," filed August 6, 1938, now U.S. Patent No. 2,541,092. A fixed "C" bias as also applied to grids 3 and 4 thereby holding the oscillator normally at cut-off until a signal from a remote source cuts the antenna dipoles and automatically drives the tubes into an operative condition or a state of oscillation.

A more detailed description of the present device may be obtained upon referring to the circuit contained in FIG. 1 and assuming that a radio obstacle detection signal of standard frequency having a pulse length and repetition rate according to FIG. 4 is cutting the dipole antenna 9, 9'. The induced voltage in dipole 9, 9' will, if of sufficient intensity, oversome the C bias applied to the grid of the tubes and drive the same into a regenerative state to thereby render the circuit in a state of oscillation to start grids 3 and 4 drawing a rectified current and thereby charge condenser 12 according to the portion a–b of FIG. 5. Grid current will continued to flow until the charge on condenser 12 together with the "C" bias becomes large enough to quench oscillations (represented as occurring at point b in FIG. 5), at which point condenser 12 will begin its exponential discharge according to portion b–c to maintain the tubes at cut-off. Consequently the subsequent keying pulses of FIG. 4 will not drive the circuit into oscillation again until the magnitude of the keying pulse exceeds the cut-off bias due to the voltage on condenser 12 and the fixed "C" bias. It therefore become obvious that the pulse repetition rate of the present device is a function of both the field intensity of the remote transmitter and the slope of the discharge path of condenser 12, while the pulse length is proportional to the charging time of condenser 12. The operating condition shown in FIGS. 4, 5 and 6 assumes that the intensity of the keying pulses is just sufficient to overcome the fixed "C" bias alone; consequently those keying pulses which occur during the discharge of condenser 12 do not affect the circuit, thereby producing at random a series of output pulses according to FIG. 6. Consequently this will provide on the oscilloscope at the remote radio detection station an occasional strong substantially rectangular pulse which will occur intermittently with the echoes and therefore indicate the presence of a friendly craft.

FIG. 10 shows a radio echo obstacle ranging station 21 comprising a pulse transmitter 22, a pulse echo receiver 23, and an oscilloscope indicator 24 ranging on an airplane 25 and receiving identifying pulses and echoes from the airplane and the pulse transmitter-receiver 26.

A second operating condition which may be frequently encountered is shown in FIGS. 7, 8 and 9 which show respectively the keying pulses, the charging and discharging characteristics of condenser 12 and the output pulses. This condition assumes that the repetition rate of the keying pulse allows condenser 12 to completely discharge before a second keying pulse strikes the dipole 9, 9' thereby causing an output pulse to occur simultaneously with a keying pulse as shown in FIGS. 7 and 9. This would ordinarily cause some confusion since echo and recognition pulses concur, but it has been the practice to choose condenser 12 so as to produce a strong broad pulse thereby providing a means for distinguishing between a recognition pulse and an echo. It must be remembered, however, that a strong keying pulse can produce an output from the present device even though condenser 12 has not completely dissipated its charge. Therefore the present device will contain a pulse repetition rate either equal to or less than the remote pulse transmitter.

In view of the fact that the present device depends upon an external source of energy for its keying means, some means of checking the continuity of operation should be provided such as a neon bulb or plate current meter.

The results obtained from both circuits contained in FIGS. 1 and 2 are identical since the major difference in the two circuits resides in the type of oscillation quenching. FIG. 1 uses grid quenching while FIG. 2 uses plate quenching. In the circuit of FIG. 2, condenser 12 is normally charged and then discharges upon the keying of the oscillator. Therefore the pulse width is proportional to the discharging time of condenser 12, while the repetition rate is a function of both the charging time of condenser 12 and the intensity of the keying pulse.

Another system by which the identity of a remote craft may be established is shown in FIG. 3. This system employs a plurality of one-half wave dipoles, indicated at 14 and 14', positioned one over the other in the same plane and interconnected by half-wave transposition lines 15. Such an antenna array can be rotatably driven whereby the amount of energy reradiated from the same in response to an energy beam impinging thereon will rise and fall as the antenna revolves. In this case the echo signal produced on the indicator at the radio echo station will likewise rise and fall to thereby indicate the presence of a friendly craft. Alternatively, the antenna may be fixedly mounted and keyed, such as by way of key 16, whereby the amount of energy reradiated from the antenna will again rise and fall, and the indication given at the radio echo station will again reveal the presence of a friendly craft.

Although I have shown and described certain and specific embodiments of the present invention, I am fully aware of the many modifications possible thereof. Therefore, this invention is not to be restricted except insofar as is necessitated by the prior art and the spirit of the appended claims.

I claim:

1. The method of identifying an obstacle shown by a radio echo obstacle ranging system having a range indicating oscilloscope comprising transmitting search pulses recurrently for incidence on remote obstacles, receiving from irradiated obstacles pulsed energy radiated in predetermined time relationship to the incidence of the search pulses and responsively thereto, indicating the received pulses on the oscilloscope in the range relationship of the obstacles and modulating the pulsed energy radiated at one obstacle to characterize that obstacle indication relative to other obstacle indications.

2. The method of identifying an obstacle shown by a radio echo obstacle ranging system having a range indicating oscilloscope comprising transmitting search pulses recurrently for incidence on remote obstacles, receiving from irradiated obstacles pulsed energy radiated in predetermined time relationship to the incidence of the search pulses and responsively thereto, indicating the received pulses on the oscilloscope in the range relationship of the obstacles and transmitting pulses generated at one obstacle responsively to the incidence of search pulses for reception and indicaton to characterize that obstacle indication relative to other obstacle indications.

3. In combination, a radio echo obstacle ranging station having a pulse transmitter operative to transmit recurrent radio search pulses and an oscilloscope operative to indicate echo pulses reflected from obstacles in the range relationship of the obstacles, a remote craft receiving the search pulses operative to return pulses to the ranging station in definite time relation with the incidence of search pulses, and means aboard the craft operative to characteristically modulate the return pulses, said ranging station comprising means applying the modulated return pulses to the oscilloscope in the range relationship of the craft to characterize its indication relative to other obstacle indications.

4. In combination, a radio echo obstacle ranging station having a pulse transmitter operative to transmit recurrent radio search pulses and an oscilloscope operative to indicate echo pulses reflected from obstacles in the range relationship of the obstacles, a remote pulse generating station receiving the search pulses operative to transmit toward the ranging station return pulses distinctively modulated relative to the search pulses responsively to incidence of the search pulses and in definite time relationship thereto, said ranging station comprising means to apply the return pulses to the oscilloscope in the range relationship of the remote station to characterize echo pulses reflected at the remote station relative to reflections from other obstacles.

5. The structure of claim 4 further including means operating the remote pulse generating station during a predetermined part of the interval between incidence of successive search pulses.

6. The structure of claim 4 further including means operating the remote pulse generating station throughout the incidence of a search pulse and during a predetermined part of the interval preceding the incidence of the succeeding search pulse.

7. A pulse echo recognition system for the air or surface craft including a station consisting of a pulse transmitter, and a pulse echo receiver, an indicator connected to said receiver for indicating the distances of pulse reflecting craft, means located on said craft for radiating from said craft pulse recognition signals in response to challenging signals from said station, means for receiving said pulse recognition signals, and means for applying said recognition signals to said indicator so that each of said distance indicating signals may be compared to each of said indicated recognition signals.

References Cited by the Examiner

UNITED STATES PATENTS

| | | | |
|---|---|---|---|
| 1,899,684 | 2/1933 | Haigis | 250—36.14 X |
| 1,958,971 | 5/1934 | Lux | 250—27.1 X |
| 1,981,884 | 11/1934 | Taylor et al. | 250—2.2 |
| 2,028,857 | 1/1936 | Zworykin. | |
| 2,134,716 | 11/1938 | Gunn | 250—2.3 |
| 2,143,035 | 1/1939 | Smith. | |
| 2,178,237 | 10/1939 | Linder | 250—1.33 |
| 2,212,110 | 8/1940 | Bevermann | 343—18 X |
| 2,252,083 | 8/1941 | Luck | 250—11.36 |
| 2,287,533 | 6/1942 | Peterson | 250—15 |
| 2,320,428 | 6/1943 | Hansell | 250—15 |
| 2,333,688 | 11/1943 | Shepard. | |
| 2,344,813 | 3/1944 | Goldstine | 250—15 |
| 2,405,765 | 8/1946 | Smith | 250—15 |
| 2,885,665 | 5/1959 | Wolff | 343—6.5 |

CHESTER L. JUSTUS, *Primary Examiner.*

C. D. BACKUS, MELVIN H. FRIEDMAN, SIMON YAFFEE, NORMAN H. EVANS, *Examiners.*

J. B. PROUTY, A. S. TENSOR, A. K. GEER, M. A. MORRISON, T. H. TUBBESING, *Assistant Examiners.*